Patented Mar. 13, 1928.

1,662,305

UNITED STATES PATENT OFFICE.

GRAHAM EDGAR, OF DAYTON, OHIO, ASSIGNOR TO ETHYL GASOLINE CORPORATION, OF DAYTON, OHIO, A CORPORATION OF DELAWARE.

BROMINE RECOVERY.

No Drawing.    Application filed October 13, 1925.    Serial No. 62,312.

This invention relates to the recovery of bromine from sea water or like saline solutions. The object of the invention is to form with the bromine in sea water, compounds relatively insoluble therein.

As one example of a method of carrying out my invention, when treating sea water such as is found in the Atlantic Ocean, containing .006% bromine in the form of soluble bromides, I may take per one ton of this sea water, .6 of a pound of concentrated sulfuric acid, .0533 pounds of chlorine or one atom of chlorine for each atom of bromine present, and .0356 pounds of aniline sulfate. The acid, chlorine, and aniline sulfate are preferably added in the order named to form a homogeneous mixture, although good results are obtainable by adding the chlorine first. The reaction results in the formation of tribromaniline, which is insoluble in water or saline solutions. The proportional quantity of chlorine is preferably such as to liberate twice the quantity of bromine as enters into combination with the aniline sulfate to form tribromaniline. It is not necessary to use more aniline sulfate than enters into the tribromaniline. More specifically, in the example given above, the proportions are 12 atoms of chlorine to 12 atoms of bromine to 1 molecule of aniline sulfate forming two molecules of tribromaniline, 6 atoms of bromine being lost to this process by being reconverted into soluble bromides. However, the quantity of chlorine is not greater than the molecular equivalent of the bromine present in the soluble bromide, so that free chlorine is not present. The process may be repeated on the same body of sea water until all or any desired part of the bromide is in the form of tribromaniline, by adding thereto the same chemicals in the same proportion relative to the bromine contained in the already-treated sea water, the acid being omitted, if desired, since the sea water has already been acidified. The product of this reaction, tribromaniline, may be separated from the sea water by any well known means, such as filtration or flotation.

This process may be carried on as a continuous one in which the treatment of the sea water is performed while the sea water is passing through successive suitable agitating mechanism. Any of the strong mineral acids may be employed in place of sulfuric acid, and in place of the aniline sulfate other salts of aniline such as aniline hydrochloride or a compound reacting with bromine to form a substance insoluble in sea water may be employed. The yield increases generally with an increase in the acidity and with a decrease in temperature of the saline solution.

What I claim is:

1. A process of recovering bromine from saline solutions, which comprises acidifying the solution, chlorinating the solution, and forming with bromine in the solution an insoluble bromine compound.

2. A process of recovering bromine from saline solutions, which comprises acidifying the solution, chlorinating the solution, and forming with bromine in the solution an insoluble compound of bromine with aniline.

3. A process of recovering bromine from a saline solution, which comprises treating the solution with chlorine and forming with the bromine an insoluble compound of bromine with aniline.

4. A process of recovering bromine from saline solutions, which comprises treating the solution with not more than one atom of chlorine for each atom of bromine present therein, and forming with the bromine an insoluble compound of bromine with aniline.

5. A process of recovering bromine from saline solutions which comprises treating the solution with not more than one atom of chlorine for each atom of bromine therein, acidifying the solution, and adding to the solution a substance which reacts with the bromine to form an insoluble bromine compound.

6. A process of recovering bromine from saline solutions which comprises treating the solution with not more than one atom of chlorine for each atom of bromine therein, acidifying the solution, and forming with the bromine an insoluble compound of bromine with aniline.

7. A process of recovering bromine from saline solutions which comprises treating the solution with not more than one atom of chlorine for each atom of bromine therein, acidifying the solution, and adding thereto aniline sulfate, forming tribromaniline.

8. A process of recovering bromine from saline solutions which comprises chlorinating the solution, and forming with the bromine in the solution an insoluble bromine compound.

In testimony whereof I hereto affix my signature.

GRAHAM EDGAR.